United States Patent [19]

Koshida et al.

[11] 4,008,295
[45] Feb. 15, 1977

[54] THERMOPLASTIC RESIN COMPOSITION

[75] Inventors: Toshiro Koshida, Kobe; Yasuo Nakagawa, Nishinomiya, both of Japan

[73] Assignee: Sumitomo Bakelite Company, Limited, Tokyo, Japan

[22] Filed: July 18, 1975

[21] Appl. No.: 597,185

[30] Foreign Application Priority Data

July 22, 1974 Japan .............................. 49-83233
July 31, 1974 Japan .............................. 49-87052

[52] U.S. Cl. .......................... 260/876 R; 260/889; 260/891; 428/462
[51] Int. Cl.² ........................................ C08L 51/04
[58] Field of Search ............... 260/876 R, 890, 891, 260/889; 428/462

[56] References Cited

UNITED STATES PATENTS 2,802,809   8/1957   Hayes ........................... 260/876 R

*Primary Examiner*—J. Ziegler
*Attorney, Agent, or Firm*—Karl W. Flocks

[57] ABSTRACT

A vinyl chloride polymer composition consisting essentially of 60 to 40% by weight of a vinyl chloride-ethylene copolymer having an average degree of polymerization of 300 to 500 and an ethylene content of 1 to 10% by weight and 40 to 60% by weight of at least one interpolymer selected from the group consisting of acrylonitrile-butadiene-styrene terpolymers and acrylonitrile-methyl methacrylate-butadiene-styrene quadripolymers. This composition has a heat deformation temperature of 75° to 90° C and is capable of easily giving by injection molding an article having a good surface appearance, a good gloss due to its excellent moldability and excellent impact resistance.

15 Claims, 3 Drawing Figures

THERMOPLASTIC RESIN COMPOSITION

This invention relates to a thermoplastic resin composition which is improved in dimensional stability at elevated temperatures, moldability, and impact resistance, and more particularly, to an improvement of a vinyl chloride polymer composition.

Because of their heat deformation temperature of up to about 70° C, molded articles comprising unplasticized polyvinyl chloride compound may be used for those machine parts which are required to withstand temperatures within said range such as those of household electrical appliances and of automobiles, whereas they cannot be used for those parts which are required to withstand temperatures higher than said heat deformation temperature. The injection molding of polyvinyl chloride is quite difficult, because the fused resin temperature suitable for the molding is close to the decomposition temperature of polyvinyl chloride. Further, since gaseous hydrogen chloride is set free on decomposition of polyvinyl chloride, it is necessary to pay attention to corrosion of the metallic mold and to working environment. Such disadvantages have incurred reluctance among molders in accepting the injection molding of polyvinyl chloride. Consequently, polyvinyl chloride has so far been used only in production of small-sized molded articles such as pipe joints, switchboard housings, water collecting pieces for gutter, and telephone housings and parts.

The term "heat deformation temperature" as used in this Specification and Claims means the heat deformation temperature as measured in conformity with the testing method specified in ASTM D 648 (under a fiber stress of 66 psi).

On the other hand, as for the large-sized molded articles which require a dimensional stability at elevated temperatures, there have been widely used those thermoplastics which are hardly susceptible to decompostion during the injection molding cycle, such as, for example, polystyrene and ABS resin which is an acrylonitrile-butadiene copolymer grafted with styrene. Articles of polystyrene and ABS resins, however, have such disadvantages as lack of self-extinguishing property and surface gloss characteristic of polyvinyl chloride articles, low mar resistance, and low resistance to organic solvents. Underwriters' Laboratories, Inc. has recently revised UL-492, standard for radio and television receiving appliances, to establish flammability standards for plastic materials to be used. Although there have been developed flame resistant polystyrene or ABS resins by incorporating into polystyrene or ABS resins such flame retardants or flame retarding aids as antimony trioxide, halogen compounds, and phosphorus compounds, such flame resistant resins are inferior in electrical characteristics, thermal stability and moldability, and are more expensive than plain resins, while no improvement can be seen in such disadvantages of the resins themselves as inferior surface gloss, low mar resistance, and low solvent resistance. Moreover, the flame retardants or flame retarding aids used will unavoidably contaminate the natural environment, because they are difficult to degrade, that is, accumulative, and toxic. Therefore, the general trend is to place restrictions by law upon the use of such agents, so that their diminished availability may be anticipated in the future.

Such a disadvantage of polystyrene or ABS can be eliminated by use of polyvinyl chloride which has self-extinguishing property. However, because of its low heat deformation temperature and difficult molding, polyvinyl chloride raises another problem which places limits upon the type of articles moldable from polyvinyl chloride. Accordingly, there have heretofore been made various attempts to raise the heat deformation temperature of articles comprising polyvinyl chloride as a major component. One of the results of such attempts is chlorinated polyvinyl chloride which is obtained by reacting polyvinyl chloride with gaseous chlorine in an aqueous medium and is known to have an improved heat deformation temperature. The heat deformation temperature rises with an increase in chlorine content to reach, as is known, a temperature as high as 100° C. The use field of polyvinyl chloride might be expected to expand by chlorination because of increased heat deformation temperature. However, chlorination results in a marked deterioration in both impact strength and moldability and thus prevents expansion of the use field of chlorinated polyvinyl chloride. In the case of chlorinated polyvinyl chloride, with an increase in chlorine content the fusion temperature becomes higher and the flow becomes inferior so that not only the injection molding but also, in some cases, the granulation become impossible.

Another method for improving the heat deformation temperature of molded articles is to use a so-called fiber glass-reinforced polyvinyl chloride molding compound obtained by mixing polyvinyl chloride with glass fibers. Although the articles obtained from the fiber glass-reinforced polyvinyl chloride molding compound by injection molding is excellent in dimensional stability, and mechanical strengths, said compound has such a defect that the glass fibers contained in it wear the screw and cylinder of the molding machine or the mold cavity during the injection molding operation. Further, since the compound contains glass fibers, it is inferior in moldability to polyvinyl chloride itself, and hence, the injection molding of a large-sized article from the compound is very difficult. Moreover, since the glass fibers contained in the compound appear on the surface of the molded article to decrease the surface gloss, the fiber glass-reinforced polyvinyl chloride molding compound is not suited for use in molding those articles which are required to be of beautiful appearance.

As a result of various investigations conducted to overcome aforesaid disadvantages, the present inventors have found a vinyl chloride polymer composition having an improved impact resistance, which may easily be injection molded to give a thin-walled article, a large-sized article, or a complicated article having desirable appearance and gloss and capable of retaining dimensional stability at a temperature as high as 75° to 90° C.

An object of this invention is to provide a thermoplastic resin composition capable of giving an article having self-extinguishing property and a heat deformation temperature of 75° to 90° C.

Another object of this invention is to provide a resin composition comprising a vinyl chloride ethylene copolymer and an interpolymer, which may give a thin-walled article, a large-sized article, or a complicated article having a good appearance and a good gloss due to the excellent moldability of the resin composition.

A further object of this invention is to provide a thermoplastic resin composition having an improved impact resistance and an improved dimensional stability at elevated temperatures.

Other objects and advantages of this invention will become apparent from the following description.

According to this invention, there is provided a vinyl chloride polymer composition which consists essentially of 60 to 40% by weight of a vinyl chloride-ethylene copolymer having an average degree of polymerization of 300 to 500 and an ethylene content of 1 to 10% by weight (hereinafter referred to merely as Vc-Et copolymer) and 40 to 60% by weight of at least one -interpolymer selected from the group consisting of acrylonitrile-butadiene-styrene terpolymers having a heat deformation temperature of 80° to 100° C (hereinafter referred to merely as ABS) and acrylonitrile-methyl methacrylate-butadiene-styrene quardripolymers having a heat deformation temperature of 80° to 100° C (hereinafter referred to merely as AMBS), and which has a favorable dimensional stability at elevated temperatures, moldability, and impact resistance, without losing the self-extinguishing property inherent to the Vc-Et copolymer.

In this invention, it is critical to use the above-mentioned Vc-Et copolymer as the polyvinyl chloride component. Although the heat deformation temperature can be improved by incorporating ABS and/or AMBS into homopolymer of vinyl chloride, the resulting composition is inferior in flow property so that the injection molding of a large-sized article becomes impossible.

As compared with the homopolymer of vinyl chloride, the polyvinyl chloride composition of this invention is easily processed by injection molding to give an article having a heat deformation temperature of 75° to 90° C, an excellent impact strength, and self-extinguishing property.

The Vc-Et copolymers to be used in this invention are those which have an average degree of polymerization of 300 to 500 and an ethylene content of 1 to 10% by weight. Vc-Et copolymers having an average degree of polymerization of more than 500 have markedly low flow property and hence are difficult to mold a large size product. Vc-Et copolymers having an average degree of polymerization of less than 300 have an improved flow property but are remarkably inferior in heat deformation temperature and impact strength. Therefore, it is necessary for the Vc-Et copolymer to have an average degree of polymerization of 300 to 500 in the present invention in order to obtain a vinyl chloride polymer composition excellent in thermal resistance, flow property and impact strength, i.e., having well balanced properties. Moreover, it is necessary for the Vc-Et copolymer to have an ethylene content of 1 to 10% by weight, and when the ethylene content is less than 1% by weight, the flow property is not improved and when it is more than 10% by weight, the thermal resistance is not improved.

The interpolymer to be compounded with the Vc-Et copolymer can be ABS alone, AMBS alone, or a mixture of both. The ABS resins should have a heat deformation temperature of 80° to 100° C as measured in compliance with ASTM D 648, under a fiber stress of 66 psi and include those prepared by mixing an acrylonitrile-styrene copolymer latex and an acrylonitrile-butadiene copolymer latex to form a dispersion (blending method), by grafting an acrylonitrile-styrene copolymer onto a styrene-butadiene copolymer, by partial chemical combination of an acrylonitrile-styrene copolymer with an acrylonitrile-butadiene copolymer to form a graft-blend composite mixture, and by other methods of preparation. If a thermally stable ABS having a heat deformation temperature higher than 100° C is used in compounding, owing to a large difference in fusion temperature between the ABS and the Vc-Et copolymer, both resins are not sufficiently compatible with each other, resulting in an injection-molded article containing the residual unfused ABS, and hence, have an insufficiently developed heat deformation temperature, moldability, and impact resistance, whereas if an ABS having a heat deformation temperature lower than 80° C is used in compounding, there is not obtained an injection-molded article having a heat deformation temperature of 75° C or more and having, at the same time, an excellent self-extinguishing property, that is, well-balanced performances.

As for the AMBS, similarly to the case of ABS, although any type may be used, the heat deformation temperature should be 80° to 100° C. If an AMBS having a heat deformation temperature lower than 80° C is used in compounding, there is not obtained an injection molded article having a heat deformation temperature of 75° C or more and having, at the same time, an excellent self-extinguishing property and moldability, that is, well-balanced properties, whereas if an AMBS having a heat deformation temperature higher than 100° C is used in compounding, owing to a large difference in fusion temperature between the AMBS and the Vc-Et copolymers, both resins are not sufficiently compatible with each other, resulting in an injection-molded article containing the residual unfused AMBS, and hence, having a dimensional stability at elevated temperatures, a moldability, and an impact strength which are not developed to a full extent.

The amount of ABS or AMBS to be incorporated into the Vc-Et copolymer is 40 to 60% by weight per 60 to 40% by weight of the Vc-Et copolymer, preferably 40 to 50% by weight per 60 to 50% by weight of Vc-Et copolymer. If the amount of ABS and/or AMBS used in compounding is less than 40% by weight, a significant effect of improving the heat deformation temperature is not observed. Although the heat deformation temperature rises with an increase in amount of ABS and/or AMBS incorporated, an amount exceeding 60% by weight is undesirable because the self-extinguishing property of Vc-Et copolymer will be lost. The object of this invention can also be achieved by incorporating simultaneously both ABS and AMBS in a total amount of 40 to 60% by weight per 60 to 40% by weight of the Vc-Et copolymer. When both types of the said interpolymers are simultaneously incorporated into a Vc-Et copolymer, if the total amount of the interpolymers is less than 40% by weight, the heat deformation temperature cannot be raised above 75° C, while if the total amount exceeds 60% by weight, the self-extinguishing property is lost, resulting in a vinyl chloride polymer composition having unbalanced properties in both cases. The ratio between ABS and AMBS is not critical, and any ratio may be practicable. Thus, in order to obtain a vinyl chloride polymer composition having both the heat deformation temperature higher than 75° C and the self-extinguishing property by incorporating ABS or AMBS or both in a Vc-Et copolymers, it is absolutely necessary to use these interpolymers in a total amount of 40 to 60% by weight per 60 to 40% by weight of the Vc-Et copolymer.

Referring to the accompanying drawings, the criticality of the compounding ratio between the Vc-Et copolymer and the ABS, the AMBS or both thereof is explained below. In the accompanying drawings.

Figure 1:
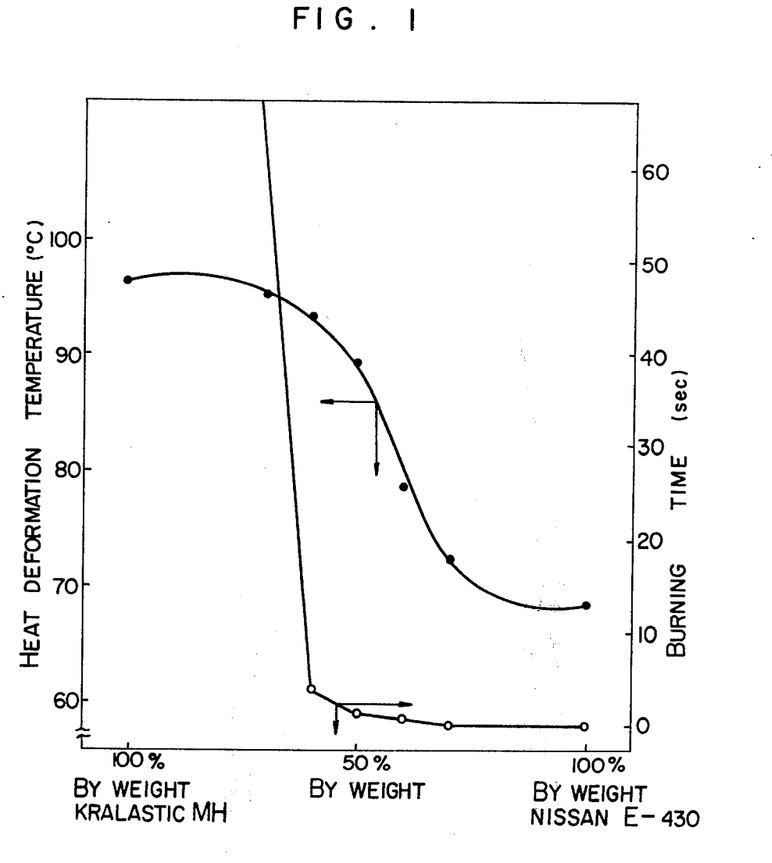
FIG. 1 is a graph showing a relationship between the heat deformation temperature and the compounding ratio fo a Vc-Et copolymer (Nissan E-430; ethylene content: 3%, average degree of polymerization: 430, Nissan Chemical Industries Co., Ltd.) to an ABS (Kralastic MH: Sumitomo Naugatuck Co., Ltd.) and a relationship between the burning time and said compounding ratio.
Figure 2:
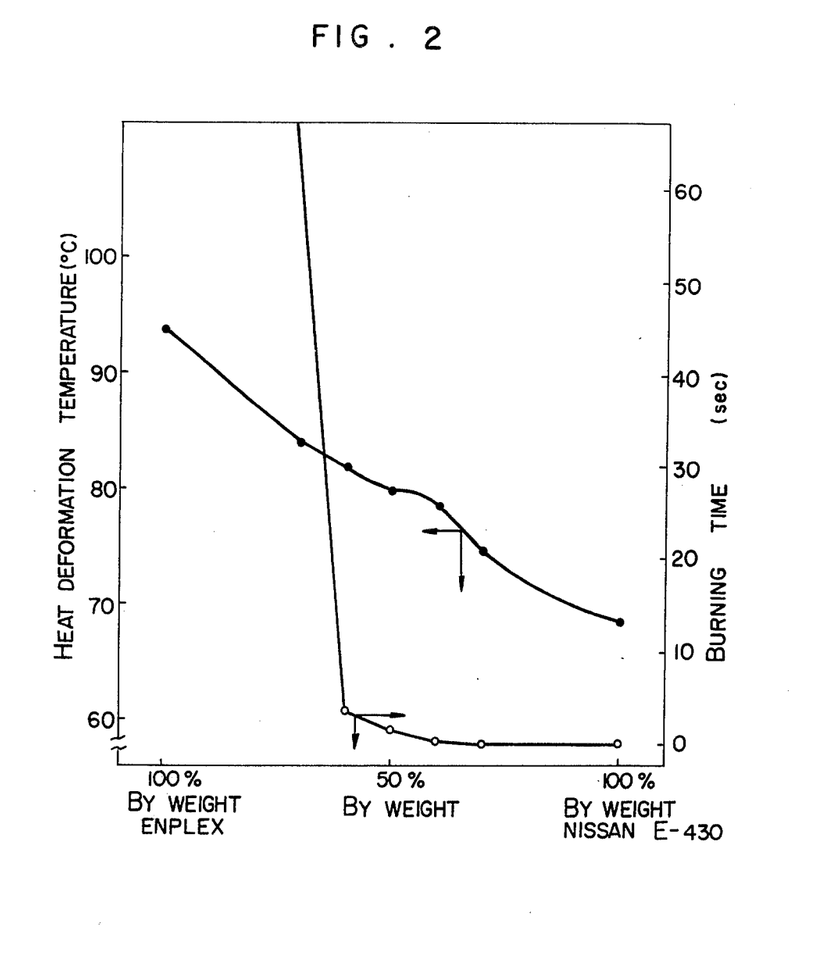
FIG. 2 is a graph showing a relationship between the heat deformation temperature and the compounding ratio of a Vc-Et copolymer (Nissan E-430) to an AMBS (Enplex: Kanegafuchi Chemical Industry Co., Ltd.) and a relationship between the burning time and said compounding ratio.
Figure 3:
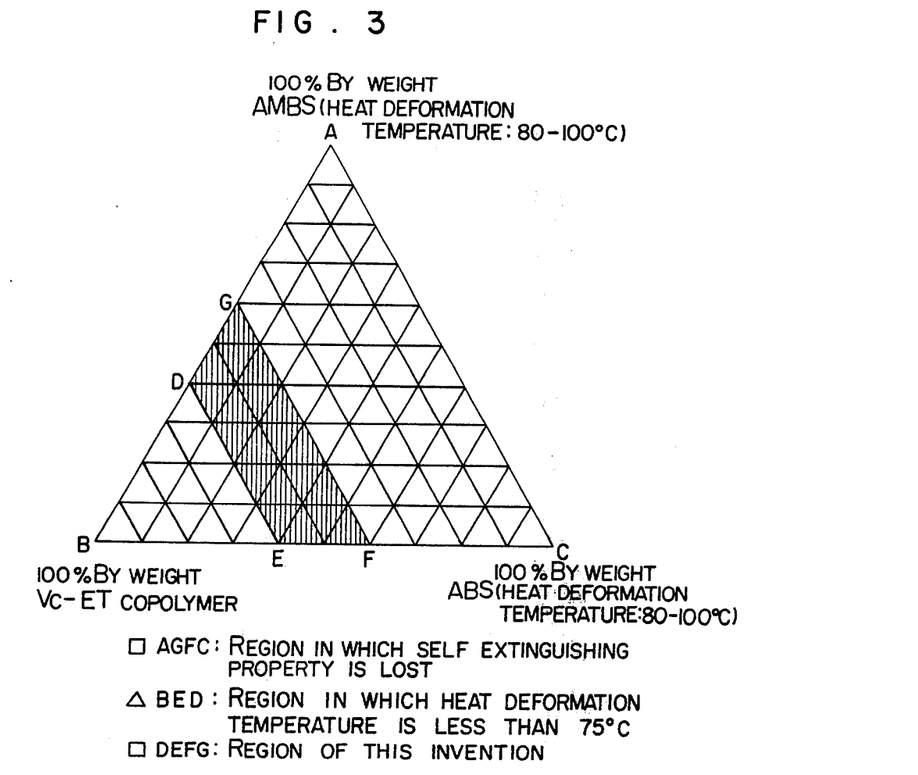
FIG. 3 is a graph showing a relationship between the compounding ratio among an ABS which has a heat deformation temperature of 80° to 100° C, an AMBS which has a heat deformation temperature of 80° to 100° C and the Vc-Et copolymer, and showing the formation of vinyl chloride polymer composition having a heat deformation temperature of 75° C or higher and a self-extinguishing property.

As shown in FIG. 1, when Kralastic MH which is an ABS having a heat deformation temperature of 96.2° C is incorporated into a Vc-Et copolymer (Nissan E-430), the enhancement of the heat deformation temperature of the Vc-Et copolymer is not so great when the amount of Kralastic MH is less than 30% by weight of the mixture, but becomes above 75° C from the point of 40% by weight. That is to say, the realtionship between the heat deformation temperature and the amount of the ABS forms an S curve having a break at 40% by weight. When the amount of the ABS exceeds 60% by weight, the heat deformation temperature becomes higher than 90° C, but the relationship between the burning time and the amount of the ABS forms an L curve having a break at 60% by weight and the self-extinguishing property of the composition is greatly lost from this point. As shown in FIG. 2, when Enplex which is an AMBS having a heat deformation temperature of 93.7° C is incorporated into the Vc-Et copolymer (Nissan E-430), the relationship of the heat deformation temperature and the amount of the AMBS forms a curve having a break at 40% by weight, and when the amount of the AMBS is less than 40% by weight, the heat deformation temperature of the composition is less than 75° C. On the other hand, there is another break at 60% by weight, and when the amount of the AMBS is more than 60% by weight, the heat deformation temperature is again greatly enhanced, but the relationship between the burning time and the amount of AMBS forms an L curve having a break at 60% by weight, and the self-extinguishing property of the composition is greatly lost from this point. As is clear from FIGS. 1 and 2, the purpose of this invention can be achieved by incorporating into the Vc-Et copolymer the ABS or the AMBS in a very specific amount, which is 40 to 60% by weight based on the weight of the resulting mixture. Furthermore, the purpose of this invention can also be achieved by incorporating both the ABS and the AMBS each having a heat deformation temperature of 80° to 100° C, into the Vc-Et copolymer in a total amount of 40 to 60% by weight based on the weight of the resulting mixture. As shown in FIG. 3 in the area AGFC, the heat deformation temperature is more than 75° C, but the self-extinguishing property is lost, and in the area BED, the self-extinguishing property is not lost, but the heat deformation temperature is less than 75° C. Therefore, the purpose of this invention cannot be accomplished. However, the area DEFG is the specific one in which a vinyl chloride polymer composition having balanced properties, namely, having a heat deformation temperature of at least 75° C without losing the self-extinguishing property, is obtained by incorporating into the Vc-Et copolymer the ABS or the AMBS each having a heat deformation temperature of 80° to 100° C, in an amount of 40 to 60% by weight, or both of the ABS and the AMBS in a total amount of 40 to 60% by weight, based on the weight of the resulting mixture. Thus, in order to obtain a vinyl chloride polymer composition having a heat deformation temperature of at least 75° C and a self-extinguishing property by incorporating ABS or AMBS, each having a heat deformation temperature of 80° to 100° C, or both thereof into the Vc-Et copolymer, it is absolutely necessary that the interpolymer component is used in a total amount of 40 to 60% by weight per 60 to 40% by weight of the Vc-Et copolymer.

To the resin compositon of this invention may, if necessary, be added stabilizers, antioxidants, fillers, ultraviolet absorbess, pigments, these being ordinarily used in vinyl chloride resins, and methyl methacrylate-butadiene-styrene terpolymer (hereinafter abbreviated to MBS) for enhancing the impact strength. When the MBS is added, the amount thereof should be up to 33 parts by weight per 100 parts by weight of the mixture of the Vc-Et copolymer and the ABS and/or the AMBS in which mixture the proportion of the Vc-Et copolymer is 40 to 60% by weight and the proportion of the latter is 60 to 40% by weight.

It is known that by incorporating the MBS, polyvinyl chloride can be improved in both moldability and impact resistance. However, the heat deformation temperature of MBS is generally low, and when an MBS having a heat deformation temperature of 72° C is alone incorporated into the Vc-Et copolymer, the impact strength can be increased with an increase in amount of the MBS without moldability being much deteriorated, but the heat deformation temperature cannot be improved even if the proportion of the MBS is 50% by weight. Nevertheless, when the MBS is added together with the ABS and/or AMBS to the Vc-Et copolymer in the above-mentioned amount, the purpose of this invention can be achieved.

The above-mentioned stabilizers, antioxidants, fillers, ultraviolet absorbers, pigments MBS and the like can be mixed with the Vc-Et copolymer by means of a conventional mixer for vinyl chloride resins, such as a roll mixer, Banbury mixer, extruder or the like without using any special mixer or necessitating any modification of the mixer, to obtain simply a homogeneous molding resin composition.

The characteristic features of the present vinyl chloride resin composition are an excellent dimensional stability at elevated temperatures, an excellent flow property, and a self-extinguishing property. For instance, as shown in Example 1, by incorporating 50% by weight of the ABS into 50% by weight of the Vc-Et copolymer, there is obtained a vinyl chloride polymer composition having a heat deformation temperature of about 85° C or more, which shows on testing with a Koka-type flow tester an extruded volume 53 times as large as that of a vinyl chloride homopolymer having an average degree of polymerization of 700 under the same conditions and about 1.25 times as large as that of ABS alone. Accordingly, thin-walled articles, large-sized articles, or complicated articles with irregularities such as ribs and bosses may easily be obtained from the present composition by injection molding. The resulting articles have a beautiful appearance and a desirable gloss which allow to dispense with the troublesome buffing step which is necessary with conventional polystyrene and ABS articles. Because of favorable flow property, the present self-extinguishing resin composition gives on injection molding an article having a weld line, where the molten resin has fused together, which is much less noticeable than in the case of polystyrene or ABS articles.

As shown in Example 1, when 50% by weight of the Vc-Et copolymer is compounded with 50 % by weight of ABS, ther is obtained a composition which shows an impact strength more than twice as high as that of vinyl chloride homopolymer and a mar resistance, which shows susceptibility of the surface of articles to scratch, as well as organic solvent resistance both superior to those of ABS; the composition also shows a self-extinguishing property, the flammability class being V-O as measured by a buring test in compliance with UL-94.

The invention is further explained with reference to Examples which are by way of illustration and not by way of limitation. The tests in the Examples were conducted by the testing methods given below.

Testing method:

a. Heat deformation test: Conducted according to ASTM D 648, under a fiber stress of 66 psi. Test specimens were in the form of bar, ½ in. × ½ in. × 5 in. The mean value of three measurements was taken as the heat deformation temperature value.

b. Inpact test: Conducted by Charpy test specified in JIS K 6745 (JIS: an abbreviation of Japanese Industrial Standards). The test specimen, 90 × 10 × 3 mm, had a V-shaped notch, 1 mm in depth. The impact value was given by the mean of five tests.

c. Kōka flow test: The test was conducted by means of a Kōka-type flow tester provided with a nozzle, 1 $\phi$ × 10 mm length. The amount of resin extruded in one second under a load of 150 kg was measured. The sample used was a pellet granulated by means of an extruder.

d. Mar resistance: Tested according to ASTM D 673. The test specimen was 30 × 50 × 2 mm in size. A No. 80 carborandum was used as the falling abrasive. The loss in surface gloss was measured by means of a glossmeter at a measurement angle of 45°.

e. Flammability test: Test was conducted according to UL-94. Test specimen was ⅛ × ½ in. × 5 in. in size.

f. Chemical resistance test: Test was conducted according to JIS K 6745. Test specimen was 25 × 50 × 1 mm in size. The mean of duplicate tests was taken as the chemical resistance value.

EXAMPLE 1

To each of the resin mixtures of the basic formulations of Sample No. 1 to No. 24 shown in Table 1, were added 3 parts by weight of tribasic lead sulfate, 0.5 part by weight of lead stearate and 0.5 part by weight of barium stearate as stabilizers and 2 parts by weight of titanium oxide as pigment. Each of the resulting resin compositions was granulated by means of an extruder. The resin composition was milled by means of a 6-inch two-roll mixer at 185° C for 5 minutes; then using a 37-ton press, the milled composition was preheated at 185° C for 5 minutes, and pressed under a pressure of 100 kg/cm² for 3 minutes to prepare test specimens. As is apparent from the test results shown in Table 1, when 50% by weight of a vinyl chloride homopolymer [S-9007 (average degree of polymerization: 700) produced by Kureha Chemical Industry Co.] was compounded with 50% by weight of Kralastic MH [heat deformation temperature: 96.2° C (Sumitomo Naugatack Co., Ltd.)], the heat deformation temperature reached 91° C or higher, whereas the flow characteristic as measured by Kōka-type flow tester was not much improved. On the other hand, when the compounding ratio of Kralastic MH to Vc-Et copolymer Nissan E-430 (average degree of polymerization: 430; ethylene content: 3%) exceeded 40% by weight, the heat deformation temperature suddenly increased and showed about 80° C and the flow characteristic was hardly deteriorated as compared with Nissan E-430 and rather superior to Kralastic MH.

When 50% by weight of Kralastic MH is mixed based on the weight of a Vc-Et copolymer having an average degree of polymerization of 500 or more, it can be seen that the flow property is greatly lowered. That is to say, when a Vc-Et copolymer having an average degree of polymerization of 650 and an ethylene content of 3% (Nissan E-650, trade mark of Nissan Chemical) is used, the flow amount is a half or less of that in the case of Nissan E-430. When a Vc-Et copolymer having an average degree of polymerization of 800 and an ethylene content of 3% (Nissan E-800, a trademark of Nissan Chemical) is used, the flow amount is substantially the same as that of Sample No. 2 which is a mixture of 50% by weight of Kralastic MH with S-9007. Thus, the flow property is not so improved.

As is clear from the above, in order to impart excellent flow property to the composition, it is necessary to use a Vc-Et copolymer having an average degree of polymerization of 300 to 500.

When an ABS having a heat deformation temperature of 68° C (Blendex 401, a trade name of UBE CYCON Co., Ltd.) was incorporated in an amount of 50% by weight as in Sample No. 10, no effect of enhancing the heat deformation temperature was observed. A thermally stable ABS (Kralastic K-2938, a trade name of Sumitomo Naugatuck Co., Ltd.) having a heat deformation temperature of 113.6° C as in Sample No. 11 was not compatible with Nissan E-430.

When Kaneace B-12 (a trade name of Kanegafuchi Chemical Industry Co., Ltd. for MBS) was compounded together with Kralastic MH and Nissan E-430, as in Sample No. 20, so as to keep the respective amounts of the latter not less than 40% by weight based on the total amount of the resin mixture, and keep the amount of Kaneace B-12 at a level usually used for the purpose of improving the impact resistance, there was obtained a vinyl chloride polymer composition having a self-extinguishing property, a high impact resistance, and a heat deformation temperature which was not much decreased. When the compounding ratio of Kralastic MH to Nissan E-430 was below 60% by weight, the burning time was below 5 seconds and the rating was V-O, whereas when the compounding ratio exceeded 60% by weight, the burning time became more than 60 seconds and the self-extinguishing properties were lost.

In order to impart to the composition balanced properties, that is, excellent in thermal resistance, flow property, and self-extinguishing property, it is clear that an ABS having a heat deformation temperature of 80° to 100° C must be added in the specific amount of 40 to 60% by weight pe 60 to 40% by weight of the Vc-Et copolymer having an average degree of polmerization of 300 to 500.

Table 1

| Sample No. | 1 | 2 | 3 | 4 | 5 | 6 | 7 | 8 | 9 |
|---|---|---|---|---|---|---|---|---|---|
| Composition (Parts by Weight) | | | | | | | | | |
| Vc-Et copolymer (Nissan E-430) | 0 | 0 | 0 | 100 | 70 | 60 | 50 | 40 | 30 |
| Vc-Et copolymer (Nissan E-650) | 0 | 0 | 0 | 0 | 0 | 0 | 0 | 0 | 0 |
| Polyvinyl chloride (Kureha S-9007) | 100 | 50 | 50 | 0 | 0 | 0 | 0 | 0 | 0 |
| ABS (Kralastic MH) | 0 | 50 | 0 | 0 | 30 | 40 | 50 | 60 | 70 |
| ABS (Blendex 401) | 0 | 0 | 0 | 0 | 0 | 0 | 0 | 0 | 0 |
| ABS (Kralastic K-2938) | 0 | 0 | 0 | 0 | 0 | 0 | 0 | 0 | 0 |
| MBS (Kaneace B-12) | 0 | 0 | 50 | 0 | 0 | 0 | 0 | 0 | 0 |
| Properties | | | | | | | | | |
| Heat deformation temperature (° C) | 74.1 | 93.6 | 76.2 | 68.3 | 72.1 | 78.2 | 89.4 | 93.3 | 94.8 |
| Flow by Koka-type flow tester (180° C) (cm³/sec) | $4.7 \times 10^{-4}$ | $5.6 \times 10^{-3}$ | $2.7 \times 10^{-3}$ | $3.0 \times 10^{-2}$ | $2.7 \times 10^{-2}$ | $2.6 \times 10^{-2}$ | $2.5 \times 10^{-2}$ | $2.3 \times 10^{-2}$ | $2.2 \times 10^{-2}$ |

| Sample No. | 10 | 11 | 12 | 13 | 14 | 15 | 16 | 17 | 18 | 19 | 20 |
|---|---|---|---|---|---|---|---|---|---|---|---|
| Vc-Et copolymer (Nissan E-430) | 50 | 50 | 0 | 0 | 0 | 0 | 50 | 0 | 0 | 60 | 50 |
| Vc-Et copolymer (Nissan E-650) | 0 | 0 | 100 | 50 | E-800 100 | E-800 50 | 0 | 0 | 0 | 0 | 0 |
| Polyvinyl chloride | 0 | 0 | 0 | 0 | 0 | 0 | 0 | 0 | 0 | 0 | 0 |
| ABS (Kralastic MH) | 0 | 0 | 0 | 50 | 0 | 50 | 0 | 100 | 0 | 30 | 40 |
| ABS (Blendex 401) | 50 | 0 | 0 | 0 | 0 | 0 | 0 | 0 | 0 | 0 | 0 |
| ABS (Kralastic K-2938) | 0 | 50 | 0 | 0 | 0 | 0 | 0 | 0 | 0 | 0 | 0 |
| MBS (Kaneace B-12) | 0 | 0 | 0 | 0 | 0 | 0 | 50 | 0 | 100 | 10 | 10 |
| Heat deformation temperature (° C) | 69.6 | Not compatible | 71.4 | 91.0 | 73.2 | 92.3 | 73.2 | 96.2 | 72.0 | 73.2 | 87.2 |
| Flow by Koka-type flow tester | $2.7 \times 10^{-2}$ | | $7.2 \times 10^{-4}$ | $8.3 \times 10^{-3}$ | $5.7 \times 10^{-4}$ | $6.8 \times 10^{-3}$ | $9.4 \times 10^{-3}$ | $2.0 \times 10^{-2}$ | $9.1 \times 10^{-3}$ | $2.4 \times 10^{-2}$ | $2.3 \times 10^{-2}$ |

| Sample No. | 21 | 22 | 23 | 24 |
|---|---|---|---|---|
| Vc-Et copolymer (Nissan E-430) | 50 | 50 | 40 | 40 |
| Vc-Et copolymer (Nissan E-650) | 0 | 0 | 0 | 0 |
| Polyvinyl chloride | 0 | 0 | 0 | 0 |
| ABS (Kralastic MH) | 25 | 20 | 35 | 20 |
| ABS (Blendex 401) | 0 | 0 | 0 | 0 |
| ABS (Kralastic K-2938) | 0 | 0 | 0 | 0 |
| MBS (Kaneace B-12) | 25 | 30 | 25 | 40 |
| Heat deformation temperature (° C) | 78.1 | 73.6 | 83.2 | 72.8 |
| Flow by Koka-type flow tester | $2.0 \times 10^{-2}$ | — | $1.9 \times 10^{-2}$ | — |

Nissan E-430: Average degree of polymerization: 430; Ethylene content: 3%
Nissan E-650: Average degree of polymerization: 650; Ethylene content: 3%
Nissan E-800: Average degree of polymerization: 800; Ethylene content: 3%

Properties (Samples 1–9)

| Sample No. | 1 | 2 | 3 | 4 | 5 | 6 | 7 | 8 | 9 |
|---|---|---|---|---|---|---|---|---|---|
| Impact strength (kg.cm/cm²) | 6.2 | 16.7 | 68.3 | 3.1 | 11.7 | 12.2 | 13.1 | 14.9 | 16.1 |
| Flammability rating | V-O | V-O | V-O | V-O | V-O | V-O | V-O | V-O | Burnt |
| Burning time (sec) | 0 | 1.3 | 1.1 | 0 | 0 | 0.3 | 1.5 | 3.7 | Above 60 |
| Mar resistance (falling sand 200 g) (%) | 26 | 34 | — | 26 | 30 | 32 | 34 | 37 | 41 |
| Resistance to gasoline (g/m²) | 0.2 | 0.4 | — | 0.2 | 0.2 | 0.3 | 0.4 | 0.6 | 0.8 |
| Resistance to alcohol (g/m²) | 0.0 | 0.1 | — | 0.0 | 0.0 | 0.1 | 0.1 | 0.3 | 0.9 |
| Resistance to 10 % aqueous soap (g/m²) | 0.0 | 0.2 | — | 0.0 | 0.0 | 0.1 | 0.2 | 0.5 | 1.1 |

Properties (Samples 10–20)

| Sample No. | 10 | 11 | 12 | 13 | 14 | 15 | 16 | 17 | 18 | 19 | 20 |
|---|---|---|---|---|---|---|---|---|---|---|---|
| Impact strength | 16.3 | | 5.8 | 14.6 | 7.8 | 14.6 | 60.8 | 23.6 | Above 100 | 15.3 | 17.2 |
| Flammability rating | V-O | | V-O | V-O | V-O | V-O | V-O | Burnt | Burnt | V-O | V-O |
| Burning time | 1.2 | | 0 | 1.3 | 0 | 1.3 | 1.3 | Above 60 | Above 60 | 0.3 | 0.5 |
| Mar resistance | 34 | Not compatible | 26 | 34 | 26 | 34 | — | 48 | — | 32 | 34 |
| Resistance to gasoline | 0.4 | | 0.2 | 0.4 | 0.2 | 0.4 | — | 1.6 | — | 0.3 | 0.4 |
| Resistance to alcohol | 0.1 | | 0.0 | 0.1 | 0.0 | 0.1 | — | 1.4 | — | 0.1 | 0.1 |

Table 1-continued

| | | | | | | | | |
|---|---|---|---|---|---|---|---|---|
| 0.2 | 0.0 | 0.2 | 0.0 | 0.2 | — | 2.3 | — | 0.1 | 0.2 |

Kralastic MH: Heat deformation temp. 96.2°0 C  
Kralastic K-2983: Heat deformation temp. 113.6° C  
Blendex 401: Heat deformation temp. 68.0° C  
Kaneace B-12: Heat deformation temp. 72.0° C

| | | | |
|---|---|---|---|
| 20.3 | — | 18.6 | — |
| V-O | — | V-O | — |
| 1.1 | — | 3.4 | — |
| 34 | — | 37 | — |
| 0.4 | — | 0.6 | — |
| 0.1 | — | 0.3 | — |
| 0.2 | — | 0.5 | — |

EXAMPLE 2

To each of the resin mixtures of the basic formulations of Sample No. 25 to No. 39 shown in Table 2 were added 3 parts by weight of tribasic lead sulfate, 0.5 part by weight of lead stearate and 0.5 part by weight of barium stearate as stabilizers, and 2 parts by weight of titanium oxide as pigment. Each of the resulting resin compositions was gradulated by means of an extruder.

The resin composition was milled by means of a 6-inch two-roll mixer at 185° C for 5 minutes; then using a 37-ton press, the milled composition was preheated at 185° C for 5 minutes, and pressed under a pressure of 100 kg/cm² for 3 minutes to prepare test specimens. As is apparent from the results shown in Table 2, when 50% by weight of an AMBS having a heat deformation temperature of 93.7° C (Enplex, produced by Kanegafuchi Chemical Industry Co.) was incorporated in a vinyl chloride homopolymer having an average degree of polymerization of 700 (Kureha S-9007, produced by Kureha Chemical Industry Co.), as in Sample No. 25, the heat deformation temperature reached 85° C or higher, whereas the flow characterstic was not much improved.

On the other hand, when Nissan E-430 was compounded with Enplex, the heat deformation temperature reached 75° C or higher at the incorporated amount of the latter of 40% by weight or more, and 81° C or higher at the incorporated amount of 60% by weight; the flow characteristic was somewhat better than that of Enplex used.

When 50% by weight of Enplex was incorporated with a Vc-Et copolymer having an average degree of polymerization of 500 or more, the flow characteristic was remarkably lowered. That is to say, when Nissan E-650 which has an average degree of polymerization of 650 is used, the flow amount becomes about a half of that when Nissan E-430 was used. When Nissan E-800 which has an average degree of polymerization of 800 was used, the flow amount was substantially the same as that in Sample No. 21 in which vinyl chloride homopolymer having an average degree of polymerization of 700 Kureha S-9007) was blended with 50% by weight of AMBS, namely, substantially no improvement in flow characteristic was seen.

When the compounding ratio of Enplex to Nissan E-430 remained below 60% by weight, the burning time was below 5 seconds, the rating being V-O, whereas when the compounding ratio of Enplex exceeded 60% by weight, the burning time became more than 60 seconds and the self-extinguishing property was lost.

In order to impart to the composition balanced properties, that is, excellent in thermal resistance, impact strength, moldability and self-extinguishing property, it is clear that the Vc-Et copolymer having an average degree of polymerization of 300 to 500 must be mixed with the specific amount of 40 to 60% by weight of the AMBS having a heat deformation temperature of 80° to 100° C.

Table 2

| Sample No. | 25 | 26 | 27 | 28 | 29 | 30 | 31 | 32 | 33 |
|---|---|---|---|---|---|---|---|---|---|
| Composition (parts by weight) | | | | | | | | | |
| Vc-Et copolymer (Nissan E-430) | 0 | 70 | 60 | 50 | 40 | 30 | 0 | 0 | 60 |
| Vc-Et copolymer (Nissan E-650) | 0 | 0 | 0 | 0 | 0 | 0 | 50 | 0 | 0 |
| Vc-Et copolymer (Nissan E-800) | 0 | 0 | 0 | 0 | 0 | 0 | 0 | 50 | 0 |
| Polyvinyl chloride (Kureha S-9007) | 50 | 0 | 0 | 0 | 0 | 0 | 0 | 0 | 0 |
| AMBS (Enplex) | 50 | 30 | 40 | 50 | 60 | 70 | 50 | 50 | 30 |
| MBS (Kaneace B-12) | 0 | 0 | 0 | 0 | 0 | 0 | 0 | 0 | 0 |
| Heat deformation temperature (° C) | 88.6 | 73.2 | 76.8 | 79.6 | 82.0 | 84.1 | 81.6 | 83.8 | 73.1 |
| Flow by Koka-type flow tester (180° C) (cm³/sec) | 8.2×10⁻³ | 3.0×10⁻² | 3.0×10⁻² | 2.9×10⁻² | 2.9×10⁻² | 2.9×10⁻² | 1.6×10⁻² | 1.0×10⁻² | 2.8×10⁻² |

| Sample No. | 34 | 35 | 36 | 37 | 38 | 39 |
|---|---|---|---|---|---|---|
| | 50 | 0 | 50 | 50 | 40 | 40 |
| | 0 | 0 | 0 | 0 | 0 | 0 |
| | 0 | 0 | 0 | 0 | 0 | 0 |
| | 0 | 0 | 0 | 0 | 0 | 0 |
| | 40 | 100 | 25 | 20 | 35 | 20 |

Table 2-continued

|  |  |  |  |  |  |  |  |  |
|---|---|---|---|---|---|---|---|---|
| 10 | 0 | 25 | 30 | 25 | 40 |  |  |  |
| 77.8 | 93.7 | 75.4 | 71.8 | 78.1 | 73.6 |  |  |  |
| $2.7\times10^{-2}$ | $2.8\times10^{-2}$ | $2.4\times10^{-2}$ | $2.2\times10^{-2}$ | $2.5\times10^{-2}$ | $2.1\times10^{-2}$ |  |  |  |

| Properties |  |  |  |  |  |  |  |  |  |
|---|---|---|---|---|---|---|---|---|---|
| Impact strength (kg cm/cm²) | 12.2 | 7.3 | 9.3 | 12.4 | 14.1 | 15.7 | 13.6 | 14.5 | 12.2 |
| Flammability rating | V-0 | V-0 | V-0 | V-0 | V-0 | Burnt | V-0 | V-0 | V-0 |
| Burning time (sec) | 1.2 | 0 | 0.2 | 1.4 | 3.3 | Above 60 | 1.2 | 1.2 | 0.2 |
| Mar resistance (%) | 35 | 31 | 33 | 35 | 38 | 42 | 35 | 35 | 33 |
| Resistance to gasoline (g/m²) | 0.3 | 0.1 | 0.1 | 0.3 | 0.4 | 0.6 | 0.3 | 0.3 | 0.1 |
| Resistance to alcohol (g/m²) | 0.2 | 0.0 | 0.1 | 0.2 | 0.6 | 1.2 | 0.2 | 0.2 | 0.1 |
| Resistance to 10 % aqueous soap (g/m²) | 0.3 | 0.0 | 0.1 | 0.3 | 0.5 | 0.7 | 0.3 | 0.3 | 0.1 |

Enplex: Heat deformation temp. 93.7° C

|  |  |  |  |  |  |
|---|---|---|---|---|---|
| 15.8 | 20.9 | 22.4 | — | 24.1 | — |
| V-0 | Burnt | V-O | — | V-O | — |
| 1.4 | Above 60 | 1.6 | — | 3.7 | — |
| 35 | 47 | 35 | — | 38 | — |
| 0.3 | 1.8 | 0.3 | — | 0.4 | — |
| 0.2 | 1.7 | 0.2 | — | 0.6 | — |
| 0.3 | 2.4 | 0.3 | — | 0.5 | — |

EXAMPLE 3

To each of the resin mixtures of the basic formulations of Sample No. 40 to No. 62 shown in Table 3 were added 3 parts by weight of tribasic lead sulfate, 0.5 part by weight of lead stearate and 0.5 part by weight of barium stearate as stabilizers, and 2 parts by weight of titanium oxide as pigment. Each of the resulting resin compositions was gradulated by means of an extruder.

The resin composition was milled on a 6-inch two-roll mixer at 185° C for 5 minutes; then using a 37-ton press, the milled composition was preheated at 185° C for 5 minutes, and pressed under a pressure of 100 kg/cm² for 3 minutes to prepare test specimens.

As is evident from the results shown in Table 3, it was found that when Nissan E-430 was compounded with 40 to 60% by weight in total of two interpolymers, i.e. Kralastic MH (an ABS) and Enplex (an AMBS), in varying ratios, the resulting resin compositions showed a heat deformation temperature of 75° C or higher and a flow characteristic which is superior to that of Kralastic MH and not much inferior to that of Nissan E-430. As is clear from Sample No. 57 and No. 58 in which Nissan E-650 and E-800 were used, respectively, which have average degrees of polymerization of more than 500, the flow characteristic was not so improved as compared with Sample No. 2 in which Kureha S-9007 which is vinyl chloride homopolymer is blended with 50% by weight of Kralastic MH and Sample No. 25 in which Kureha S-9007 is blended with 50% by weight of Enplex. When Nissan E-430 was compounded with less than 40% by weight in total of two interpolymers, i.e. Kralastic MH and Enplex, the resulting resin compositions showed a heat deformation temperature of below 75° C, whilst when the total amount of said two interpolymers was more than 60% by weight, the burning time became 60 seconds or more and the self-extinguishing property was lost.

In order to impart to the composition balanced properties, that is, excellent in thermal resistance, impact strength, and self-extinguishing property, ABS and AMBS which have a heat deformation temperature of 80° to 100° C must be simultaneously mixed in the total specific amount of 40 to 60% by weight with the Vc-Et copolymer having an average degree of polymerization of 300 to 500.

Table 3

| Sample No. | 40 | 41 | 42 | 43 | 44 | 45 | 46 | 47 | 48 |
|---|---|---|---|---|---|---|---|---|---|
| Composition (parts by weight) |  |  |  |  |  |  |  |  |  |
| Vc-Et copolymer (Nissan E-430) | 70 | 60 | 60 | 60 | 60 | 50 | 50 | 50 | 50 |
| Vc-Et copolymer (Nissan E-650) | 0 | 0 | 0 | 0 | 0 | 0 | 0 | 0 | 0 |
| Vc-Et copolymer (Nissan E-800) | 0 | 0 | 0 | 0 | 0 | 0 | 0 | 0 | 0 |
| ABS (Kralastic MH) | 20 | 10 | 20 | 30 | 20 | 10 | 20 | 30 | 40 |
| AMBS (Enplex) | 10 | 30 | 20 | 10 | 10 | 40 | 30 | 20 | 10 |
| MBS (Kaneace B-12) | 0 | 0 | 0 | 0 | 10 | 0 | 0 | 0 | 0 |
| Properties |  |  |  |  |  |  |  |  |  |
| Heat deformation temperature (° C) | 72.0 | 77.5 | 78.3 | 80.1 | 73.2 | 82.7 | 84.1 | 85.7 | 87.4 |
| Flow by Koka-type flow tester (180° C) (kg·cm/cm²) | $2.8\times10^{-2}$ | $3.0\times10^{-2}$ | $2.8\times10^{-2}$ | $2.7\times10^{-2}$ | $2.6\times10^{-2}$ | $3.0\times10^{-2}$ | $2.8\times10^{-2}$ | $2.4\times10^{-2}$ |  |

Table 3-continued

| | 49 | 50 | 51 | 52 | 53 | 54 | 55 | 56 | 57 | 58 |
|---|---|---|---|---|---|---|---|---|---|---|
| | 50 | 40 | 40 | 40 | 40 | 40 | 40 | 30 | 0 | 0 |
| | 0 | 0 | 0 | 0 | 0 | 0 | 0 | 0 | 50 | 0 |
| | 0 | 0 | 0 | 0 | 0 | 0 | 0 | 0 | 0 | 50 |
| | 30 | 10 | 20 | 30 | 40 | 50 | 40 | 10 | 30 | 30 |
| | 10 | 50 | 40 | 30 | 20 | 10 | 10 | 60 | 20 | 20 |
| | 10 | 0 | 0 | 0 | 0 | 0 | 10 | 0 | 0 | 0 |
| | 83.2 | 84.5 | 86.3 | 87.1 | 88.8 | 91.6 | 86.7 | 87.0 | 87.8 | 90.6 |
| | $2.5\times10^{-2}$ | $2.9\times10^{-2}$ | $2.7\times10^{-2}$ | $2.6\times10^{-2}$ | $2.4\times10^{-2}$ | $2.3\times10^{-2}$ | $2.3\times10^{-2}$ | $3.0\times10^{-2}$ | $9.8\times10^{-3}$ | $8.7\times10^{-3}$ |
| | 59 | 60 | 61 | 62 | | | | | | |
| | 50 | 50 | 40 | 40 | | | | | | |
| | 0 | 0 | 0 | 0 | | | | | | |
| | 0 | 0 | 0 | 0 | | | | | | |
| | 15 | 10 | 15 | 15 | | | | | | |
| | 10 | 10 | 20 | 10 | | | | | | |
| | 25 | 30 | 25 | 35 | | | | | | |
| | 76.3 | 71.8 | 80.4 | 74.1 | | | | | | |
| | $2.3\times10^{-2}$ | — | $2.0\times10^{-2}$ | — | | | | | | |

| Properties | | | | | | | | | | |
|---|---|---|---|---|---|---|---|---|---|---|
| Flammability rating | V-O | V-O | V-O | V-O | V-O | V-O | V-O | V-O | V-O | V-O |
| Burning time (sec) | 0 | 0.2 | 0.4 | 0.3 | 0.7 | 1.0 | 1.3 | 1.2 | 1.4 | |
| Mar resistance (falling sand 200 g) (%) | 30 | 33 | 31 | 32 | 33 | 34 | 34 | 36 | 35 | |
| Resistance to gasoline (g/m²) | 0.1 | 0.1 | — | 0.2 | 0.2 | 0.3 | — | — | 0.3 | |
| Resistance to alcohol (g/m²) | 0.0 | 0.1 | — | 0.1 | 0.1 | 0.2 | — | — | 0.3 | |
| Resistance to 10 % aqueous soap (g/m²) | 0.0 | 0.1 | — | 0.1 | 0.1 | 0.3 | — | — | 0.3 | |
| | V-O | V-O | V-O | V-O | V-O | V-O | V-O | Burnt Above 60 | V-O | V-O |
| | 1.7 | 3.7 | 3.0 | 3.3 | 2.9 | 3.5 | 3.6 | | 1.0 | 1.4 |
| | 35 | 38 | 39 | 38 | 38 | 37 | 38 | 42 | 34 | 34 |
| | 0.3 | 0.4 | — | — | — | 0.5 | 0.5 | 0.7 | — | — |
| | 0.3 | 0.6 | — | — | — | 0.6 | 0.6 | 1.3 | — | — |
| | 0.3 | 0.4 | — | — | — | 0.6 | 0.6 | 1.0 | — | — |
| | V-O | — | V-O | — | | | | | | |
| | 2.1 | — | 3.5 | — | | | | | | |
| | 35 | — | 38 | — | | | | | | |
| | 0.3 | — | 0.5 | — | | | | | | |
| | 0.3 | — | 0.6 | — | | | | | | |
| | 0.3 | — | 0.6 | — | | | | | | |

EXAMPLE 4

To 100 parts by weight of a resin mixture obtained by compounding 50% by weight of a Vc-Et copolymer having an average degree of polymerization pf 430 (Nissan E-430) with 50% by weight of an ABS (Kralastic MH), were added 3 parts by weight of tribasic lead sulfate, 1 parts by weight of lead stearate, 1 part by weight of calcium stearate, said three compounds having been used as stabilizers, and 2 parts by weight of titanium oxide as pigment. The resulting resin composition was granulated by means of an extruder. The resin composition was processed by using a 35-oz. in-line screw type injection machine, the temperature gradient along the heating cylinder starting from the hopper end being 175° - 205° - 220° - 225° C, and by using a twin-cavity mold to obtain a box-type article, 220 × 155 × 60 mm in size and 2.5 mm in wall thickness. The article obtained weighed 290 g and was a complicated shape article having many ribs forming grid on its surface and bosses for mounting on the other parts. The article had neither haze nor decomposition products of resin, and had a glossy beautiful appearance. When the article was allowed to stand in a hot air-circulating type oven at 80° C for 2 hours, the deformation was 0.3% and the article was resistant to 1.5 ft-lb impact.

EXAMPLE 5

To 100 parts by weight of a resin mixture obtained by incorporating 40% by weight of an ABS (Kralastic MH) and 10% by weight of an MBS (Kaneace B-12) into 50% by weight of a Vc-Et copolymer having an average degree of polymerization of 430 (Nissan E-430) were added 2.5 parts by weight of dibutyltin maleate as stabilizer, 1 part by weight of stearic acid as lubricant, and 1 part by weight of carbon black as pigment. The resulting resin composition was granulated by means of an extruder. The resin composition was molded by using a 20-oz. in-line screw type injection machine, the temperature gradient along the heating cylinder starting from the hopper end being 150° - 165 ° - 170° - 180° C, and by use of a mold which can give a molded article, 270 × 150 × 50 mm in size and 2 mm in wall thickness. The molded article was in the form of a complicated plate, weighing 155 g and having many ribs on the surface forming a grid and bosses to mount the article on other machine parts. The article had beautiful appearance with gloss, and neither dullness nor decomposition products were observed. After having been kept in a hot-air circulating oven at 80° C for 2 hours, the article showed a dimensional change of 0.4% and withstood an impact force of 1.5 ft.lb.

EXAMPLE 6

To 100 parts by weight of a resin mixture obtained by compounding 60% by weight of a Vc-Et copolymer having an average degree of polymerization of 430 (Nissan E-430) with 40% by weight of an AMBS (Kaneka Enplex), were added 2 parts by weight of dibutyltin maleate as stabilizer, 1 part by weight of stearic acid as lubricant, and 1 part by weight of carbon black as pigment. The resulting resin composition was granulated by means of an extruder.

the vinyl chloride polymer composition thus obtained was molded by using a 55-oz. in-line screw type injection machine, the temperature gradient along the heating cylinder starting from the hopper end being 115° - 150° - 160° - 165° - 170° C, and by use of a mold which can give a molded article, 600 × 400 × 20 mm in size and 2.7 mm in wall thickness. The molded article was in the form of a complicated plate with irregularites, weighing 655 g and having bosses to mount the article on other machine parts.

The article had a beautiful glossy appearance, and neither dullness nor decomposition products were observed. After having been kept in a hot-air circulating oven at 75° C for 2 hours, the article showed a dimensional change of 0.5% and sufficiently withstood an impact force of 5 ft.lb.

EXAMPLE 7

To 100 parts by weight of a resin mixture obtained by incorporating 30% by weight of an ABS (Kralastic MH), 10% by weight of an AMBS (Kaneka Enplex), and 10% by weight of an MBS (Kaneace B-12 into 50% by weight of a Vc-Et copolymer having an average degree of polymerization of 430 (Nissan E-430) were added 3 parts by weight of dibutyltin maleate as stabilizer, 0.5 part by weight of barium stearate as stabilizer, 0.5 part by weight of stearic acid as lubricant, and 2 part by weight of titanium oxide as pigment. The resulting resin composition was granulated by means of an extruder.

The vinyl chloride polymer composition thus obtained was molded by using a 75-oz. in-line screw type injection machine, the temperature gradient starting from the hopper end being 90° – 110° – 120° – 140° C, and by use of a mold which can give a molded article in the form of a plate. The molded article weighed 770 g and had beautiful and glossy appearance. After having been kept in a hot-air circulating oven at 80° C for 4 hours, the article showed a dimensional change of 0.7% and withstood an impact force of 1.5 ft.lb.

When subjected to a flammability test according to UL 94, the article showed a burning time of 1.7 seconds, and hence, may be classified as self-extinguishing, corresponding to a flammability class of V-O which is sufficient for practical use.

What is claimed is:

1. A vinyl chloride resin composition comprising 40 to 60% by weight of a vinyl chloride-ethylene copolymer having an average degree of polymerization of 300 to 500 and an ethylene content of 1 to 10% by weight and 60 to 40% by weight of an acrylonitrile-methyl methacrylate-butadiene-styrene quadripolymer having a heat deformation temperature of 80° to 100° C.

2. A composition acording to claim 1 wherein the acrylonitrile-methyl methacrylate-butadiene-styrene quadripolymer has a heat deformation temperature of 80° to 100° C as measured according to ASTM D-648 under a fiber stress of 66 psi.

3. A composition according to claim 1 wherein the amount of the vinyl chloride-ethylene copolymer is 60 to 50% by weight, and the amount of remainder is 40 to 50% by weight.

4. A composition according to claim 1 which further contains a methyl methacrylate-butadiene-styrene terpolymer in a proportion of up to 33 parts by weight per 100 parts by weight of a total of the copolymer and the quadripolymer.

5. A part for electric instruments and appliances obtained by subjecting the composition according to claim 1 to injection-molding.

6. A part for electric instruments and appliances obtained by subjecting the composition according to claim 3 to injection-molding.

7. A part for electric instruments and appliances obtained by subjecting the composition according to claim 4 to injection-molding.

8. A vinyl chloride resin composition comprising 40 to 60% by weight of a vinyl chloride-ethylene copolymer having an average degree of polymerization of 300 to 500 and an ethylene content of 1 to 10% by weight and 60 to 40% by weight of a mixture of an acrylonitrile-butadiene-styrene terpolymer having a heat deformation temperature of 80° to 100° C and an acrylonitrile-methyl methacrylate-butadiene-styrene quadripolymer having a heat deformation temperature of 80° to 100° C.

9. A composition according to claim 8, which further contains a methyl methacrylate-butadiene-styrene terpolymer in a proportion of up to 33 parts by weight per 100 parts by weight of a total of the copolymer, the terpolymer and the quadripolymer.

10. A composition according to claim 8, wherein the amount of the vinyl chloride-ethylene copolymer is 60 to 50% by weight, and the amount of remainder is 40 to 50% by weight.

11. A part for electric instruments and appliances obtained by subjecting the composition according to claim 8 to injection-molding.

12. A part for electric instruments and appliances obtained by subjecting the composition according to claim 9 to injection-molding.

13. A part for electric instruments and applicances obtained by subjecting the composition according to claim 10 to injection-molding.

14. A vinyl chloride resin composition comprising 40 to 60% by weight of a vinyl chloride-ethylene copolymer having an average degree of polymerization of 300 to 500 and an ethylene content of 1 to 10% by weight and 60 to 40% by weight of an acrylonitrile-butadiene-styrene terpolymer having a heat deformation temperature of 80° to 100° C, which further contains a methyl methacrylate-butadiene-styrene terpolymer in a proportion of up to 33 parts by weight per 100 parts by weight of a total of the copolymer and the terpolymer.

15. A part for electric instruments and appliances obtained by subjecting the composition according to claim 14 to injection-molding.

* * * * *